United States Patent [19]
Lane, Jr. et al.

[11] Patent Number: 5,423,598
[45] Date of Patent: Jun. 13, 1995

[54] SAFETY APPARATUS

[75] Inventors: Wendell C. Lane, Jr., Romeo; Robert M. Varga, Rochester Hills, both of Mich.

[73] Assignee: TRW Vehicle Safety Systems Inc., Lyndhurst, Ohio

[21] Appl. No.: 75,686

[22] Filed: Jun. 11, 1993

[51] Int. Cl.⁶ ............................................. A47C 31/00
[52] U.S. Cl. ................................. 297/479; 297/474; 297/480; 280/806
[58] Field of Search ............... 297/477, 468, 469, 474, 297/479, 480, 486; 280/806

[56] References Cited

U.S. PATENT DOCUMENTS

| | | | |
|---|---|---|---|
| 3,439,932 | 4/1969 | Lewis et al. | |
| 3,442,529 | 5/1969 | Lewis et al. | 297/479 |
| 3,535,001 | 10/1970 | Lewis et al. | 297/479 X |
| 3,547,490 | 12/1970 | Stoffel | 297/479 |
| 3,667,806 | 6/1972 | Sprecher | 297/479 |
| 3,695,697 | 10/1972 | Stoffel | 297/479 |
| 4,159,848 | 7/1979 | Manz et al. | |
| 5,029,896 | 7/1991 | Ernst | 297/479 X |

*Primary Examiner*—Laurie K. Cranmer
*Attorney, Agent, or Firm*—Tarolli, Sundheim & Covell

[57] ABSTRACT

An improved safety apparatus (10) is used in association with a belt (16) which restrains movement of an occupant of a vehicle. The belt (16) is taken up by and paid out from a retractor assembly (22). Upon the occurrence of vehicle deceleration greater than a predetermined deceleration, a solenoid assembly (132) operates a clamp assembly (28) to grip the belt (16) and prevent paying out of the belt. In one embodiment of the invention, the retractor assembly (22) includes a sensor assembly (54) which operates a retainer assembly (56) to prevent withdrawal of the belt from the retractor assembly when the deceleration of the vehicle is in excess of a predetermined deceleration. The sensor assembly (54) is mounted on a movable carriage (32) in the retractor assembly (22). Although the clamp assembly (28) and the retractor assembly (22) may be used in many different locations in a vehicle, they are advantageously located on the back (24) of a vehicle seat (12).

23 Claims, 4 Drawing Sheets

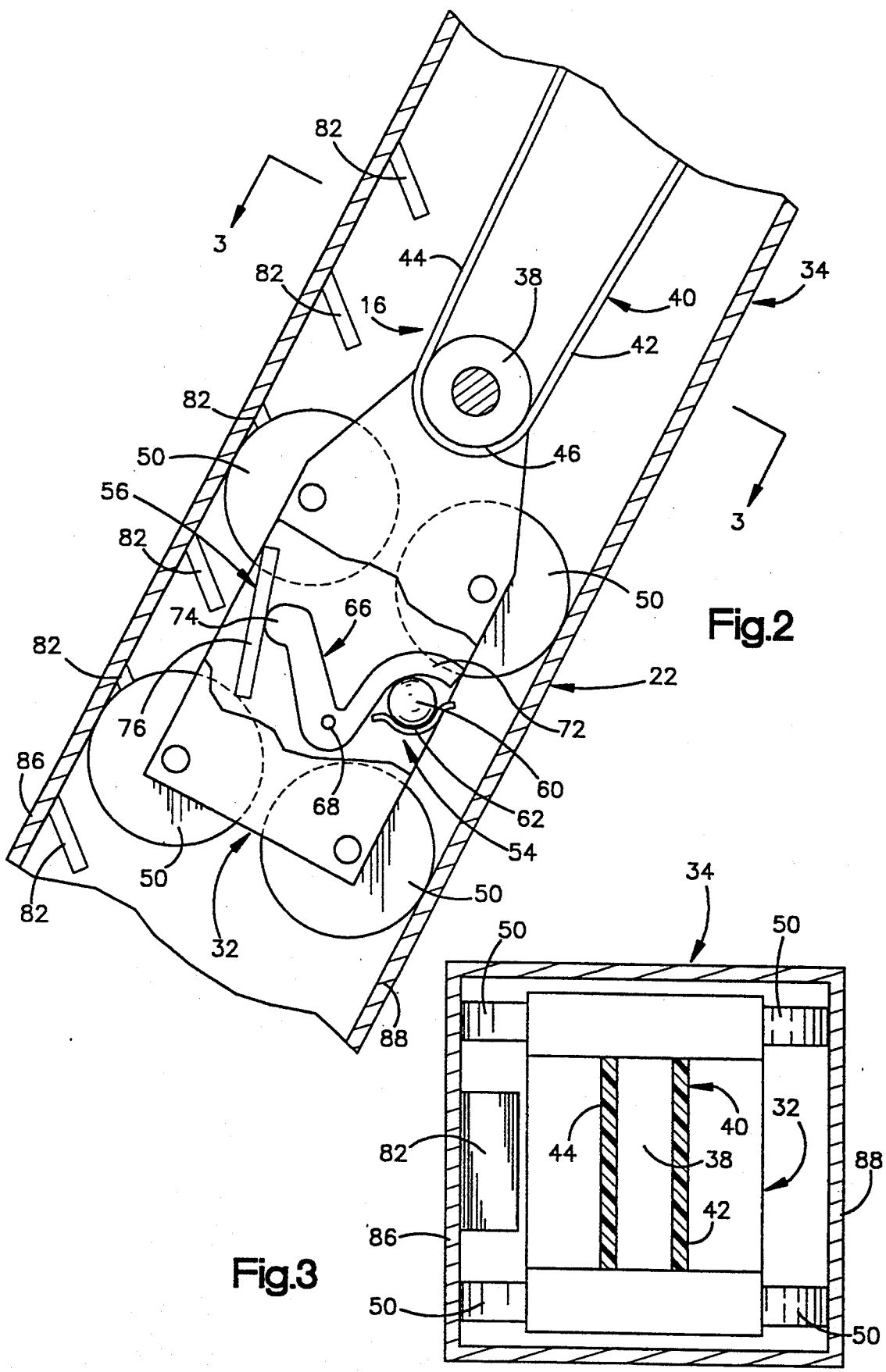

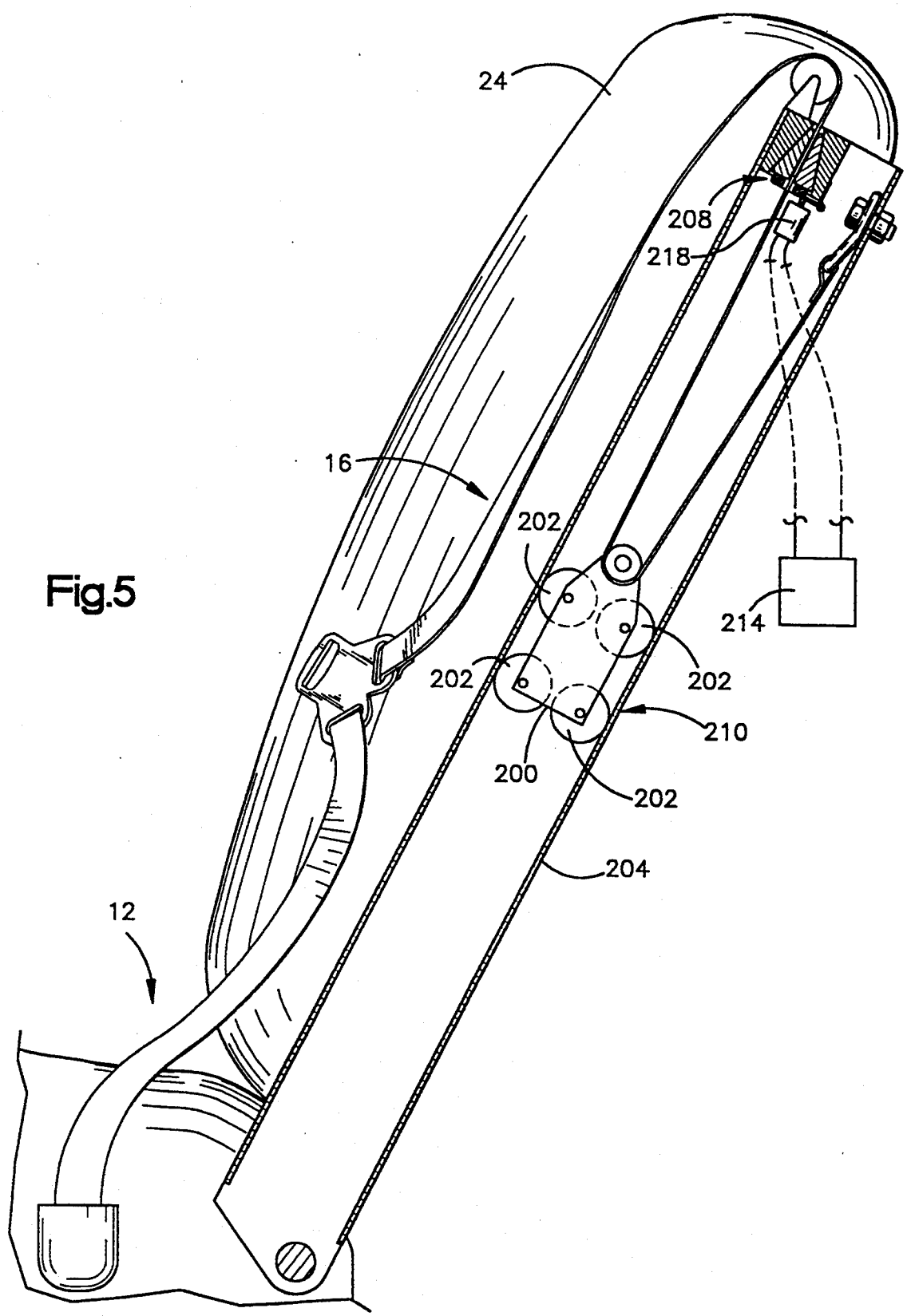

SAFETY APPARATUS

BACKGROUND OF THE INVENTION

The present invention relates to a new and improved safety apparatus having a seat belt which restrains movement of an occupant of a vehicle.

A known safety apparatus in which a seat belt restrains movement of an occupant of a vehicle is disclosed in U.S. Pat. No. 4,159,848. The safety apparatus disclosed in this patent includes a carriage which is movable along a linear track attached to the roof of the vehicle. A locking pawl is disposed on the carriage and is engageable with teeth on the track. An inertia mass is mounted adjacent to one end of the track. Upon the occurrence of a predetermined vehicle deceleration, the inertia mass is moved to actuate the locking pawl to prevent movement of the carriage along the track.

A safety apparatus in which a belt restrains movement of an occupant of a vehicle is also disclosed in U.S. Pat. No. 3,439,932. This safety apparatus includes a counterweight which is disposed in an upright tube on the back of a seat of the vehicle. The counterweight is connected to one end of the belt and is effective to tension the belt. An inertia member mounted on the back of the seat is operable to actuate a clamp assembly to grip the belt when the deceleration of the vehicle exceeds a predetermined deceleration.

SUMMARY OF THE INVENTION

The present invention relates to a safety apparatus in which a seat belt restrains movement of an occupant of a vehicle. The safety apparatus includes a retractor assembly which is operable to take up the seat belt and to pay out the seat belt. A clamp assembly is operable from a disengaged condition to an engaged condition to grip the seat belt and prevent withdrawal of the belt from the retractor assembly. A solenoid assembly operates the clamp assembly between the disengaged and engaged conditions. Although the clamp assembly and retractor assembly could be mounted at many different locations within the vehicle, it is preferred to mount the clamp assembly and retractor assembly on a structural portion of the back of a vehicle seat.

The retractor assembly may include a mass which is connected with the belt to tension the belt. When the belt is withdrawn from the retractor assembly, the mass is moved upward. In one embodiment of the invention, a sensor is mounted on the mass. The sensor effects operation of a retainer assembly to prevent upward movement of the mass when the deceleration of the vehicle exceeds a predetermined deceleration.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is an enlarged fragmentary sectional view of a portion of the vehicle safety apparatus of FIG. 1;

FIG. 3 is a view taken generally along the line 3—3 of FIG. 2;

FIG. 5 is a partially broken away elevational view, generally similar to FIG. 1, of a second embodiment of the vehicle safety apparatus of the present invention.

DESCRIPTION OF SPECIFIC PREFERRED EMBODIMENT OF THE INVENTION

General Description

Figure 1:
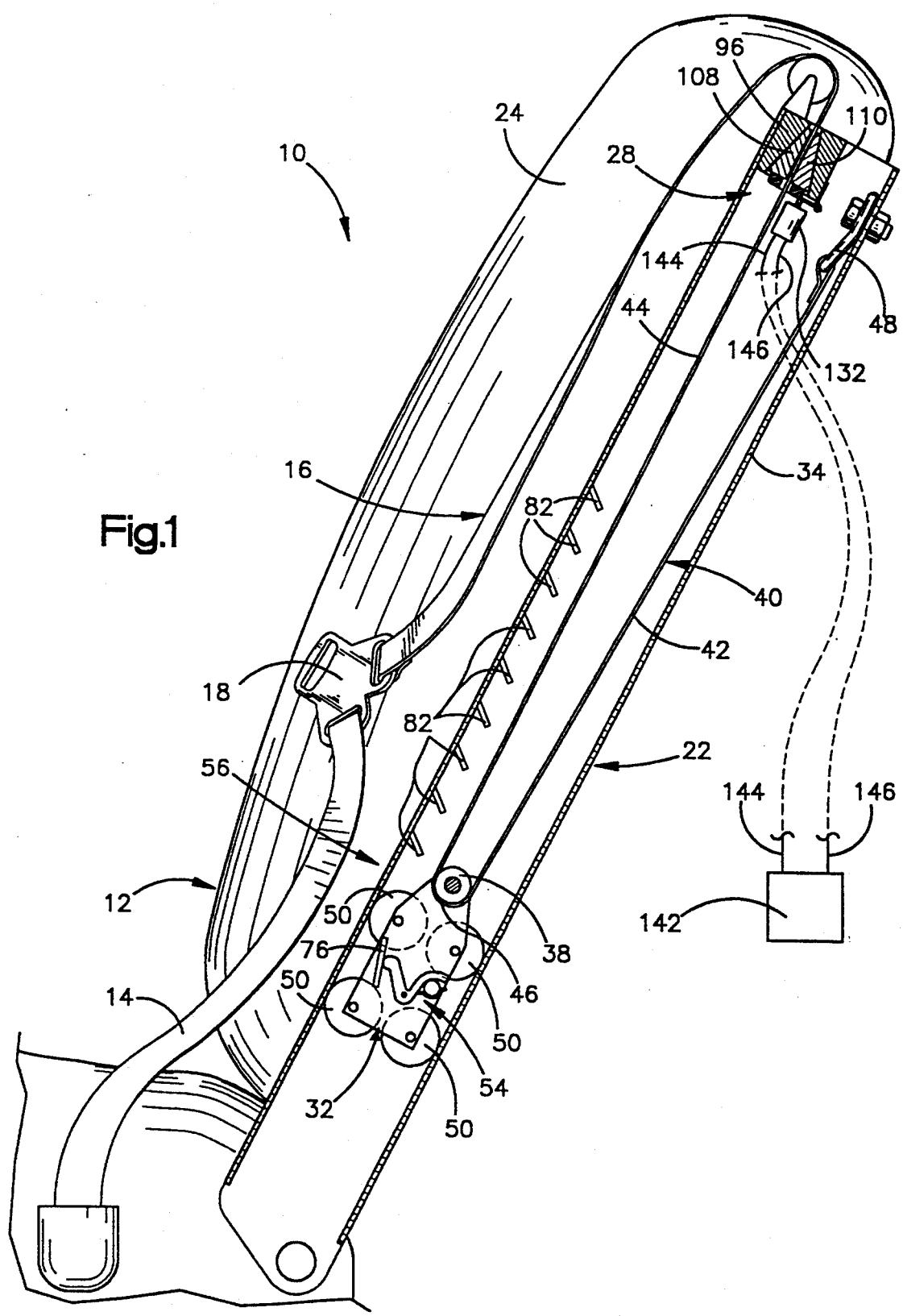
FIG. 1 is a partially broken away elevational view of a vehicle safety apparatus constructed in accordance with the present invention.

Although a vehicle safety apparatus 10 (FIG. 1) constructed in accordance with the present invention may be mounted at many different locations within a vehicle, the apparatus is illustrated in FIG. 1 on a seat 12 of the vehicle. The vehicle safety apparatus 10 includes a lap belt 14 and a shoulder belt 16 which are connected to a tongue 18. The tongue 18 is insertable into a buckle (not shown) to secure end portions of the lap belt 14 and shoulder belt 16 against movement relative to an occupant of the vehicle seat 12.

A retractor assembly 22 is disposed on a back 24 of the vehicle seat 12 and may either be outside the fabric or other exterior covering of the seat back 24 or hidden within the seat back. The retractor assembly 22 pays out a portion of the shoulder belt 16 when an occupant in the vehicle seat leans forward. The retractor assembly 22 takes up a portion of the shoulder belt 16 when the occupant moves back against the seat back 24. The retractor assembly 22 is effective to maintain tension in the shoulder belt 16 during movement of the occupant relative to the vehicle seat 12.

A clamp assembly 28 is also mounted on the back 24 of the vehicle seat 12. The clamp assembly 28 is operable to grip the shoulder belt 16 at a location between the tongue 18 and retractor assembly 22. When the clamp assembly 28 grips the shoulder belt 16, the shoulder belt cannot be paid out.

In the embodiment of the invention illustrated in FIG. 1, the retractor assembly 22 and clamp assembly 28 are mounted on the back 24 of the vehicle seat 12. However, it is contemplated that the retractor assembly 22 and clamp assembly 28 could be mounted at other locations in a vehicle. For example, the clamp assembly 22 and retractor assembly 28 could be mounted on the B-pillar of a vehicle.

Retractor Assembly

The retractor assembly 22 includes a carriage 32 which is movable along a track 34 within the back 24 of the vehicle seat 12. In the illustrated embodiment of the invention, the track 34 has a longitudinal central axis that slopes at an acute angle relative to a vertical axis. The angle at which the track 34 slopes relative to the vertical axis will vary with adjustment of the seat back 24.

A pulley 38 is mounted on the carriage 32 and engages a variable length loop 40 in the shoulder belt 16. The variable length loop 40 includes a first linear portion 42 and a second linear portion 44 which are interconnected by an arcuate portion 46.

An upper end of the first linear portion 42 of the loop 40 is secured to a D-ring 48. The arcuate portion 46 of the loop 40 is engaged by the pulley 38 on the carriage 32. The weight of the carriage 32 functions as a mass which pulls the arcuate portion 46 of the loop 40 downward to tension the shoulder belt 16.

A plurality of rollers 50 are provided on the carriage 32 to facilitate movement of the carriage along the track 34. The carriage 32 has a rectangular configuration, and there are eight rollers 50 connected with the carriage 32. Thus, there is a roller 50 at each of the corner portions of the generally rectangular carriage 32 (FIGS. 2 and 3).

A sensor assembly 54 (FIG. 2) is mounted on the carriage 32 and is operable to actuate a retainer assembly 56 to prevent upward movement of the carriage 32 and withdrawal of the shoulder belt 16 from the retractor assembly 22. The sensor assembly 54 includes a spherical inertia mass 60 which is supported in a generally hemispherical recess in a support member 62 connected with the carriage 32. When the vehicle experiences a deceleration which is greater than a predetermined deceleration, the mass 60 moves relative to the support member 62.

An actuator lever 66 has a pivot mounting 68 which supports the actuator lever for pivotal movement relative to the carriage 32. A curved end portion 72 on the actuator lever 66 engages the mass 60. An opposite end portion 74 of the actuator lever 66 engages a pawl 76 of the retainer assembly 56. The pawl 76 is supported for pivotal movement on the carriage 32. The pawl 76 has portions which are received in openings (not shown) in the carriage 32 and which move in the openings when the pawl is pivoted.

In addition to the pawl 76, the retainer assembly 56 includes a linear array of stationary retainer teeth 82. When the retainer pawl 76 is pivoted in a counterclockwise direction (as viewed in FIG. 2) by the actuator lever 66, the pawl 76 moves toward the retainer teeth 82. A slight upward movement of the carriage 32 then causes the pawl 76 to move into abutting engagement with a lower side surface of one of the retainer teeth 82 to block further upward movement of the carriage 32. Blocking upward movement of the carriage 32 prevents withdrawal of the shoulder belt 16 from the retractor assembly 22.

The track 34 has a generally rectangular cross sectional configuration (FIG. 3). The rollers 50 engage opposite side walls 86 and 88 of the track 34. The retainer teeth 82 are formed in the left (as viewed in FIG. 3) side wall 86 of the track 34 and are disposed between the rollers 50 which engage the side wall 86 of the track. There is adequate clearance between the teeth 82, the rollers 50, and the carriage 32 to enable the carriage to move up and down along the track 34 without interference when the retainer pawl 76 is in the retracted position shown in FIG. 2.

As illustrated in the drawings, the sensor assembly 54 may pivot the pawl upon adjustment of the seat back from the position illustrated. However, known structure could be provided to avoid such pivotal motion.

Clamp Assembly

The clamp assembly 28 is operable to grip a portion of the shoulder belt 16 disposed between the carriage 32 and the tongue 18 (FIG. 1) to prevent withdrawal of the shoulder belt 16 from the retractor assembly 22. The clamp assembly 28 includes a base 96 (FIG. 4) which is fixedly secured to the upper end portion of the track 34 adjacent to the upper end of the seat back 24. Specifically, the base 96 is fixedly secured to the side wall 86 of the track 34.

The base 96 has a pair of flat rectangular cam surfaces 100 and 102. The cam surfaces 100 and 102 cooperate to define a generally V-shaped opening 104 through which the shoulder belt 16 extends. A pair of wedge-shaped clamp members 108 and 110 are disposed in engagement with and are slidable relative to the cam surfaces 100 and 102. The clamp members 108 and 110 have serrated clamp surfaces 112 and 114. The clamp surfaces 112 and 114 are spaced a relatively small distance from opposite side surfaces 116 and 118 of the shoulder belt 16 when the clamp assembly 28 is in the disengaged condition shown in FIG. 4.

An actuator ring 122 extends around the shoulder belt 16 and abuts against the lower (as viewed in FIG. 4) ends of the clamp members 108 and 110. An actuator lever 124 is fixedly connected with the actuator ring 122. The actuator lever 124 is pivotally supported at 126 for movement relative to the base 96 of the clamp assembly 28.

A solenoid assembly 132 is operable to pivot the actuator lever 124 in a clockwise direction relative to the base 96 of the clamp assembly 28. The solenoid assembly 132 includes a cylindrical core 134 which is partially enclosed by a coil 136. Upon energization of the coil 136, the core 134 is extended, in a known manner, to pivot the actuator lever 124 upward (as viewed in FIG. 4).

Figure 4:
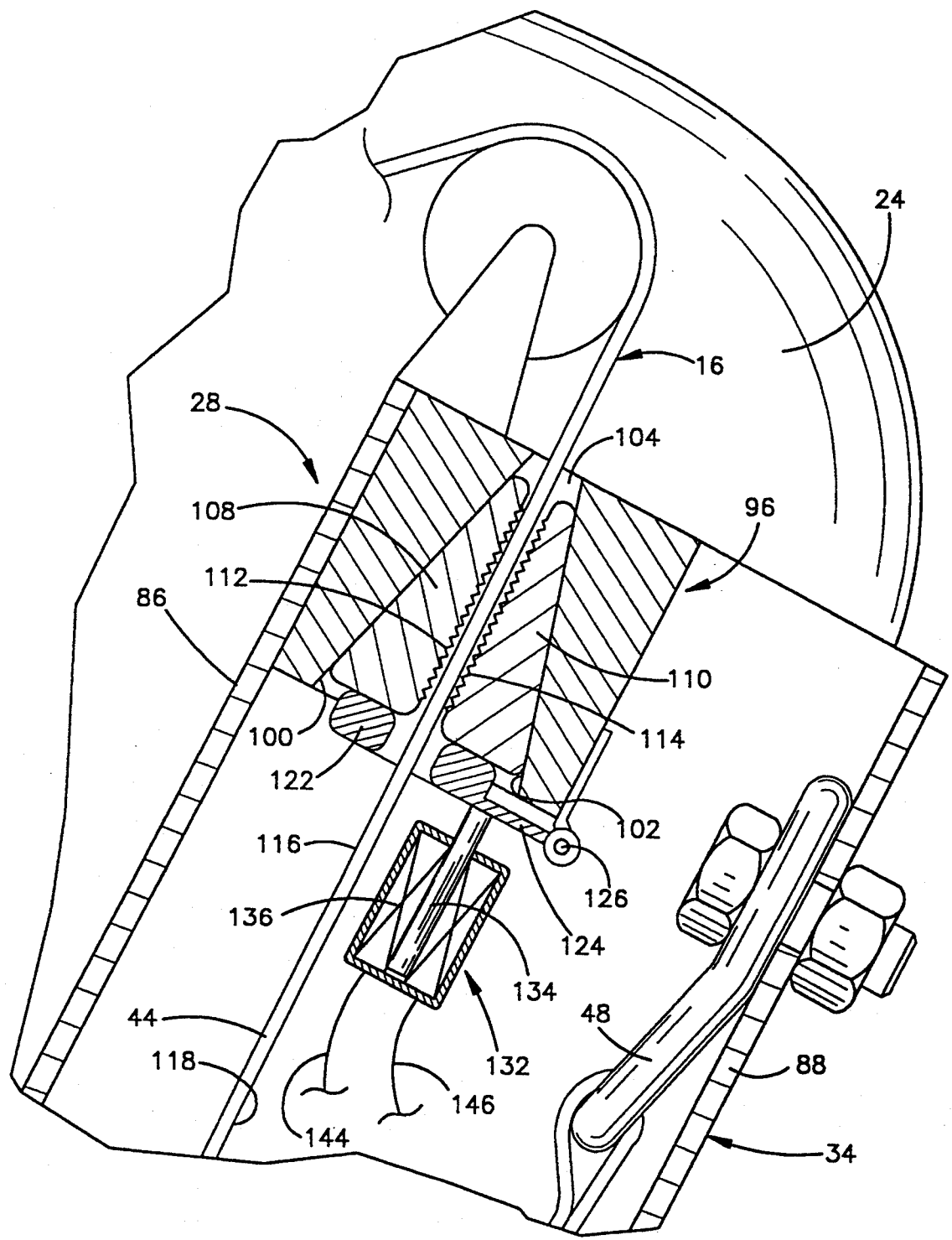
FIG. 4 is an enlarged fragmentary sectional view of a portion of the vehicle safety apparatus of FIG. 1.

When the actuator lever 124 is pivoted upward (as viewed in FIG. 4) relative to the base 96, the actuator ring 122 presses the clamp members 108 and 110 upward (as viewed in FIG. 4). This causes the serrated surfaces 112 and 114 on the clamp members 108 and 110 to move into engagement with the side surfaces 116 and 118 of the shoulder belt 16. The clamp members 108 and 110 cooperate with the cam surfaces 100 and 102 to grip the shoulder belt 16 firmly and hold it against withdrawal from the retractor assembly 22 (FIG. 1).

A control assembly 142 (FIG. 1) is connected with the solenoid assembly 132 by leads 144 and 146. The control assembly 142 includes a sensor which senses when the vehicle deceleration is greater than a predetermined deceleration. When the control assembly 142 senses that the vehicle deceleration is greater than a predetermined deceleration, the control assembly 142 completes an electrical circuit through leads 144 and 146 to effect energization of the coil 136 (FIG. 4) in the solenoid assembly 132.

The control assembly 142 could be mounted at any desired location within the vehicle. For example, the control assembly 142 may be mounted on the back 24 of the seat 12. However, it is preferred to mount the control assembly 142 at a location in the vehicle remote from the seat 12. For example, the control assembly 142 may be mounted on the fire wall of the vehicle.

The control assembly 142 contains a sensor which responds to vehicle deceleration. When the vehicle experiences a deceleration which is greater than a predetermined deceleration, the sensor in the control assembly 142 actuates a switch to effect energization of the solenoid assembly 132. The sensor in the control assembly 142 responds to the same rate of vehicle deceleration as the sensor assembly 54 in the retractor assembly 22. However, if desired, the sensor in the control assembly 142 may respond to either a somewhat greater or somewhat smaller rate of vehicle deceleration. The sensor in the control assembly 142 may have the same construction as disclosed in U.S. Pat. Nos. 5,036,304 or 5,066,837.

Operation

When the shoulder belt 16 is in a nonuse or stowed position shown in FIG. 1, the carriage 32 is in its lowermost position relative to the track 34. At this time, a relatively long portion of the shoulder belt 16 is stored in the track 34.

When an occupant enters the seat 12, the tongue 18 is manually moved toward and inserted into a buckle (not shown). As the tongue 18 is moved toward the buckle, the shoulder belt 16 is withdrawn from the retractor assembly 22. As this occurs, the length of the loop 40 is reduced and the carriage 32 moves upward along the track 34. The weight of the carriage 32 on the arcuate portion 46 of the loop 40 maintains tension in the shoulder belt 16. As the occupant moves forward and backward relative to the seat 12, the length of the loop 40 varies and the carriage 32 moves up and down along the track 34.

In the event of vehicle deceleration above a predetermined amount, the pawl 76 locks against teeth 82 to prevent withdrawal of the shoulder belt 16. Also, the clamp 28 is actuated to prevent withdrawal of the shoulder belt.

Second Embodiment

The embodiment of the invention illustrated in FIG. 5 has the same general construction and mode of operation as the embodiment of the invention shown in FIGS. 1-4. However, in the embodiment of the invention illustrated in FIG. 5, the sensor assembly 54 and the retainer assembly 56 have been omitted. Thus, in the embodiment of the invention illustrated in FIG. 5, a retractor assembly 210 functions only to tension the shoulder belt 16 and does not prevent paying out of the shoulder belt.

In the embodiment of the invention shown in FIG. 5, the retractor assembly 210 includes a carriage 200 that is connected with the shoulder belt 16. The carriage 200 has rollers 202 which are movable along a track 204 formed in the back 24 of a vehicle seat 12. The carriage 200 differs from the carriage 32 in the embodiment of the invention shown in FIGS. 1-4, in that the carriage 200 does not have a sensor assembly, corresponding to the sensor assembly 54 of FIG. 1, to detect when the vehicle deceleration exceeds a predetermined deceleration.

A clamp assembly 208 having the same construction and mode of operation as the clamp assembly 28, is provided to grip the shoulder belt 16. When a control assembly 214 detects a rate of vehicle deceleration which is greater than a predetermined rate, a solenoid assembly 218 is energized to operate the clamp assembly 208 to grip the shoulder belt 16.

Although the clamp assembly 208 and solenoid assembly 218 have been disclosed herein as being used in conjunction with a retractor assembly 210 having the carriage 200, it is contemplated that the clamp assembly and solenoid assembly could be used in conjunction with a different type of retractor assembly.

From the above description of the invention, those skilled in the art will perceive improvements, changes and modifications. For example, the clamp assembly 28 and solenoid assembly 132 may be used with retractor assemblies other than the retractor assembly 22. In addition, while the lap belt 14 and shoulder belt 16 are illustrated as separate belts secured to a common tongue 18, they could be merely separate portions of a single belt on which the tongue is mounted for sliding movement. Such improvements, changes and modifications within the skill of the art are intended to be covered by the appended claims.

Having described the invention, the following is claimed:

1. A safety apparatus in which a belt restrains movement of an occupant of a vehicle, said safety apparatus comprising:
    retractor means for taking up and paying out a portion of the belt, said retractor means including a mass which is connected with the belt to tension the belt, said mass being movable relative to the vehicle during taking up and paying out of the belt by said retractor means;
    a retainer element which is movable with said mass relative to the vehicle, said retainer element being movable relative to said mass between a disengaged position in which said retainer element is ineffective to retain said mass against movement and an engaged position in which said retainer element is effective to retain said mass against movement; and
    sensor means for detecting a rate of vehicle deceleration greater than a predetermined rate and for moving said retainer element relative to said mass from the disengaged condition to the engaged condition in response to detection of a vehicle deceleration greater than the predetermined deceleration, said sensor means being connected with said mass for movement with said mass relative to the vehicle.

2. An apparatus as set forth in claim 1 further including clamp means operable between a disengaged condition for allowing the belt to be withdrawn from said retractor means and an engaged condition for gripping a portion of the belt to prevent withdrawal of the belt from said retractor means.

3. An apparatus as set forth in claim 2 further including solenoid means for operating said clamp means from the disengaged condition to the engaged condition.

4. An apparatus as set forth in claim 1 further including elongated guide means disposed in a back of a seat of the vehicle and having a longitudinal central axis disposed at an acute angle to a vertical plane for guiding movement of said mass relative to the back of the seat of the vehicle during taking up and paying out of the belt by said retractor means.

5. An apparatus as set forth in claim 4 further including clamp means mounted on the back of the seat of the vehicle adjacent to an upper end portion of said guide means for gripping a portion of the belt to prevent withdrawal of the belt from said retractor means.

6. An apparatus as set forth in claim 5 further including second sensor means for detecting a vehicle deceleration greater than a predetermined deceleration and for effecting operation of said clamp means to grip a portion of the belt in response to said second sensor means detecting a vehicle deceleration greater than a predetermined deceleration.

7. An apparatus as set forth in claim 4 further including roller means connected with said mass and disposed in engagement with said guide means for facilitating movement of said mass relative to said guide means.

8. A safety apparatus in which a belt restrains movement of an occupant of a vehicle, said safety apparatus comprising:
    retractor means for taking up and paying out a portion of the belt;
    clamp means operable between a disengaged condition for allowing the belt to be withdrawn from said retractor means and an engaged condition for gripping a portion of the belt to prevent withdrawal of the belt from said retractor means; and solenoid means for operating said clamp means from the disengaged condition to the engaged condition;

wherein a variable length loop is formed in said belt, said loop having an upper end portion, a first variable length portion extending downward from said upper end portion, a second variable length portion extending upward, and a connector portion extending between said first and second variable length portions, said retractor means including a mass which is connected with said connector portion of said loop and is urged downward under the influence of gravity to tension said first and second variable length portions of said loop, said mass is movable upward during shortening of the first and second variable length portions of said loop to effect a paying out of a portion of the belt from said retractor means, said mass being movable downward during lengthening of the first and second variable length portions of said loop to effect a taking up of a portion of the belt by said retractor means, and wherein said retractor means further comprises means for preventing upward movement of said mass thereby to prevent paying out of a portion of the belt from said retractor means.

9. A safety apparatus in which a belt restrains movement of all occupant of a vehicle, said safety apparatus comprising:

retractor means for taking up and paying out a portion of the belt;

clamp means operable between a disengaged condition for allowing the belt to be withdrawn from said retractor means and an engaged condition for gripping a portion of the belt to prevent withdrawal of the belt from said retractor means; and solenoid means for operating said clamp means from the disengaged condition to the engaged condition;

wherein said retractor means includes a mass which is connected with the belt and is urged downward under the influence of gravity to tension the belt, guide means for guiding movement of said mass during the paying out and taking up of the belt by said retractor means, and retainer means for retaining said mass against movement relative to said guide means, said retainer means including a series of first retainer elements connected with said guide means and a second retainer element connected with said mass for movement therewith relative to said guide means, said second retainer element being movable relative to said mass to engage at least one of said first retainer elements to retain said mass against movement relative to said guide means.

10. An apparatus as set forth in claim 9 further including sensor means mounted on said mass for detecting a vehicle deceleration greater than a predetermined deceleration, said sensor means including means for moving said second retainer element relative to said mass to position said second retainer element for engagement with at least one of said first retainer elements in response to said sensor means detecting a vehicle deceleration greater than the predetermined deceleration.

11. A safety apparatus in which a belt restrains movement of an occupant of a vehicle, said safety apparatus comprising:

retractor means for taking up and paying out a portion of the belt;

clamp means operable between a disengaged condition for allowing the belt to be withdrawn from said retractor means and an engaged condition for gripping a portion of the belt to prevent withdrawal of the belt from said retractor means; and solenoid means for operating said clamp means from the disengaged condition to the engaged condition;

wherein said retractor means, clamp means and solenoid means are disposed on a back of a seat of the vehicle, said retractor means including first sensor means for detecting a vehicle deceleration greater than a first predetermined deceleration and for effecting operation of said retractor means to a condition retarding withdrawal of the belt from said retractor means upon detecting of a vehicle deceleration greater than the first predetermined deceleration, and second sensor means for detecting a vehicle deceleration greater than a second predetermined deceleration and for effecting operation of said solenoid means to operate said clamp means from the disengaged condition to the engaged condition in response to said second sensor means sensing a vehicle deceleration greater than the second predetermined deceleration.

12. An apparatus as set forth in claim 11 wherein said first sensor means is disposed on the back of the seat of the vehicle and said second sensor means is disposed on a portion of the vehicle remote from the back of the seat of the vehicle.

13. An apparatus as set forth in claim 12 wherein said first predetermined deceleration and said second predetermined deceleration are the same deceleration.

14. An apparatus as set forth in claim 11 wherein said retractor means includes a mass which is connected with the belt to tension the belt, said mass being movable upward relative to the back of the vehicle seat by the belt during withdrawal of the belt from said retractor means, said mass being movable downward relative to the back of the vehicle seat during taking up of the belt by said retractor means, said first sensor means being disposed on said mass for movement therewith relative to the back of the vehicle seat.

15. An apparatus as set forth in claim 14 further including a retainer element disposed on said mass for movement therewith relative to the back of the vehicle seat, said retainer element being movable relative to said mass between a disengaged position in which said retainer element is ineffective to retain said mass against movement relative to the back of the vehicle seat to an engaged position in which said retainer element is effective to retain said mass against upward movement relative to the back of the vehicle seat, said first sensor means being operable to effect movement of said retainer element from the first position to the second position in response to said first sensor means detecting a vehicle deceleration greater than the first predetermined deceleration.

16. An apparatus as set forth in claim 11 wherein said retractor means includes a guide track disposed on the back of the vehicle seat, said guide track having a longitudinal central axis which is disposed at an acute angle to a vertical axis, said retractor means including a mass which is connected with the belt and is movable upward along said guide track during withdrawal of the belt from said retractor means, said mass being movable downward along said guide track during taking up of the belt by said retractor means.

17. An apparatus as set forth in claim 16 further including retainer means for retaining said mass against upward movement relative to said guide track, said retainer means including a series of first retainer elements disposed along said guide track and a second retainer element connected with said mass for movement therewith relative to said guide track, said first sensor means being operable to effect movement of said second retainer element into engagement with at least one of said first retainer elements in response to said first sensor means detecting a vehicle deceleration greater than the first predetermined deceleration.

18. A safety apparatus in which a belt restrains movement of an occupant of a vehicle, said safety apparatus comprising:
   retractor means for taking up and paying out a portion of the belt;
   clamp means operable between a disengaged condition for allowing the belt to be withdrawn from said retractor means and an engaged condition for gripping a portion of the belt to prevent withdrawal of the belt from said retractor means; and
   solenoid means for operating said clamp means from the disengaged condition to the engaged condition;
   said clamp means including a base and two clamp members, said base having a pair of cam surfaces which define a generally V-shaped opening, each of said clamp members being wedge-shaped and being slidably engaged against a respective one of said cam surfaces, the belt extending between said clamp members and through said V-shaped opening, said solenoid means moving each of said clamp members along said respective cam surface for camming each of said clamp members inwardly to engage and grip the belt.

19. A safety apparatus as set forth in claim 18, wherein said solenoid means includes an actuator member engaging each of said clamp members.

20. A safety apparatus as set forth in claim 19, wherein said actuator member is a lever pivotably mounted relative to said base.

21. A safety apparatus as set forth in claim 20, wherein said lever includes a ring extending around the belt and engaging each of said clamp members.

22. A safety apparatus as set forth in claim 20, wherein said retractor means, said clamp means and said solenoid means are disposed on a back of a seat of the vehicle, said lever engages a lower end of each of said clamp members, upon activation of said solenoid means said lever pivots toward an upper end of the back of the seat of the vehicle and moves said clamp members along said cam surfaces toward the upper end.

23. A safety apparatus as set forth in claim 18, wherein each of said clamp members has a serrated surface adjacent to the belt for engaging the belt.

* * * * *